(12) United States Patent
Korhonen

(10) Patent No.: US 8,108,256 B2
(45) Date of Patent: Jan. 31, 2012

(54) SYSTEM FOR ADVERTISING ON NETWORKED PRINTERS

(75) Inventor: John V. Korhonen, Letchworth Garden (GB)

(73) Assignee: Xerox Corporation, Norwalk, CT (US)

( * ) Notice: Subject to any disclaimer, the term of this patent is extended or adjusted under 35 U.S.C. 154(b) by 1195 days.

(21) Appl. No.: 11/519,156

(22) Filed: Sep. 11, 2006

(65) Prior Publication Data

US 2008/0065477 A1   Mar. 13, 2008

(51) Int. Cl.
*G06Q 30/00* (2006.01)
(52) U.S. Cl. .................................... 705/14.49
(58) Field of Classification Search .............. 705/14, 705/14.49
See application file for complete search history.

(56) References Cited

U.S. PATENT DOCUMENTS

| | | | | |
|---|---|---|---|---|
| 6,424,426 | B1* | 7/2002 | Henry | 358/1.15 |
| 6,913,195 | B2* | 7/2005 | Shinkai | 235/381 |
| 2002/0017570 | A1* | 2/2002 | Shinkai | 235/492 |
| 2002/0080384 | A1* | 6/2002 | Hobbs | 358/1.15 |
| 2002/0129140 | A1* | 9/2002 | Peled et al. | 709/224 |
| 2004/0177000 | A1 | 9/2004 | Takamine | |
| 2009/0240588 | A1* | 9/2009 | Turner et al. | 705/14 |

OTHER PUBLICATIONS

Demirjian, Karoun. "Millions Learn the Art of Coupon Clicking," Christian Science Monitor, Mar. 27, 2006.*
Crowe, Thomas. "FCC adopts new fax advertising rules," Business Communications Review, Nov. 2003.*
Goodway, Nick. "New advertising idea takes first steps," Evening Standard, Apr. 30, 2004.*

* cited by examiner

*Primary Examiner* — Michelle Tarae
(74) *Attorney, Agent, or Firm* — Fay Sharpe LLP

(57) ABSTRACT

A system for advertising on a networked printer includes a target entity and a trusted source entity. The target entity includes a networked printer and a plurality of work stations operated by a respective plurality of users. Each workstation communicates with the networked printer. The networked printer includes a controller configured to generate a banner sheet. The banner sheet includes user identifying printer indicia for distinguishing different print jobs that are printed by the networked printer. The trusted source entity includes an advertisement delivery device in communication with the controller of the networked printer. The advertisement delivery device communicates with the controller of the networked printer to deliver an advertisement that is printed on the banner sheet generated by the networked printer. The advertisement is printed in addition to the user identifying printing indicia that is already printed on the banner sheet.

7 Claims, 4 Drawing Sheets

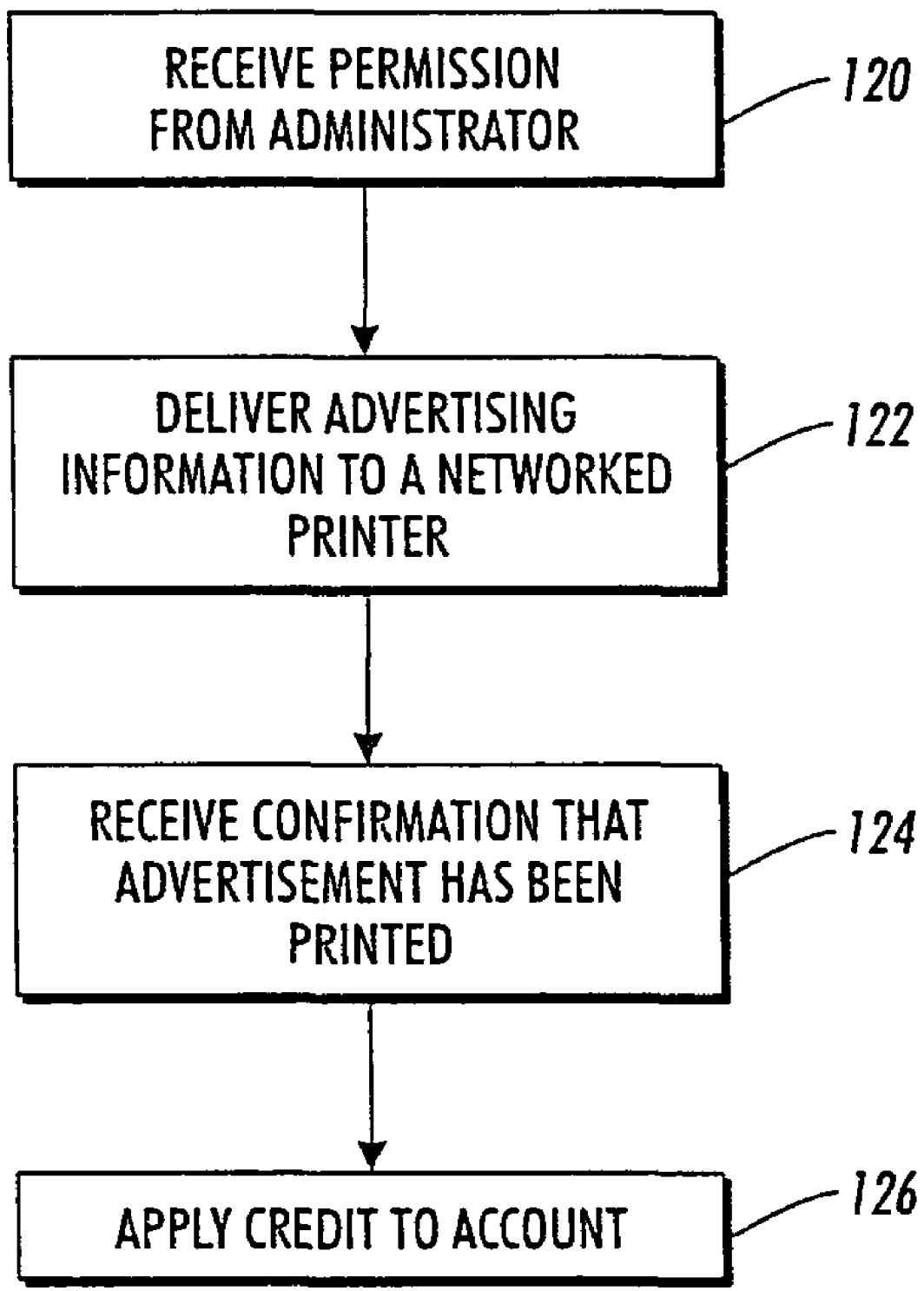

SYSTEM FOR ADVERTISING ON NETWORKED PRINTERS

BACKGROUND

Systems where advertisers fax advertisements to a company's fax machine are expensive to operate. These systems require the usage of a public telephone network and the advertiser who is delivering the message must pay for usage on the network. These fax advertising systems are also not very affective at reaching someone who is willing to read the advertisement. The recipient of unwanted faxes receives marketing information that they have not asked for. Unwanted faxes are likely to be discarded without being read. Moreover, unwanted faxes can keep the fax line busy and any received faxes also cost the recipient company in consumables such as paper and ink.

Land mail or direct distribution based advertising systems are also expensive to advertisers because the advertiser must pay for postage. Many times the advertising material is discarded before being read.

Both of the above-mentioned systems also suffer from the loss of a target audience; unwanted facsimiles and unwanted mail are typically easy to distinguish from other communications and are therefore often discarded without the advertisement ever being read. Another problem with the above-mentioned methods is that both cause irritation to the recipients because filtering desired communications from undesired communications takes time, which can cause the intended message from the advertiser to the recipient to turn negative in nature.

BRIEF DESCRIPTION

An example of a system for advertising on a networked printer includes a first entity, e.g. a target entity, and a second entity, e.g. a trusted source entity. The target entity includes a networked printer and a plurality of work stations operated by a respective plurality of users. Each workstation communicates with the networked printer. The networked printer includes a controller configured to generate a banner sheet. The banner sheet includes user identifying printer indicia for distinguishing different print jobs that are printed by the networked printer. The trusted source entity includes an advertisement delivery device in communication with the controller of the networked printer. The advertisement delivery device communicates with the controller of the networked printer to deliver an advertisement that is printed on the banner sheet generated by the networked printer. The advertisement is printed in addition to the user identifying printing indicia that is already printed on the banner sheet.

An example of a method for advertising on a networked printer includes the following steps: receiving a main print job from a work station; receiving advertisement information from an advertising source; printing a banner sheet; and printing the main print job. The banner sheet includes an advertisement based on the received advertising information and indicia for separating the main print job from other print jobs.

An example of a method for advertising on a system that includes networked printers comprises the following steps: receiving permission from an administrator of a network system of a target entity to provide advertising information to a networked printer of the target entity; and delivering advertising information to the networked printer according to the permission of the administrator. An advertisement based on the advertising information is incorporated into a banner sheet that is created by the network printer. Some sort of remuneration may be provided to the target entity in exchange for the permission being granted and/or the number of advertisements that are printed.

BRIEF DESCRIPTION OF THE DRAWINGS

FIG. 4 is also a schematic diagram of an example of a method for advertising on a networked printer.

DETAILED DESCRIPTION

Figure 1:
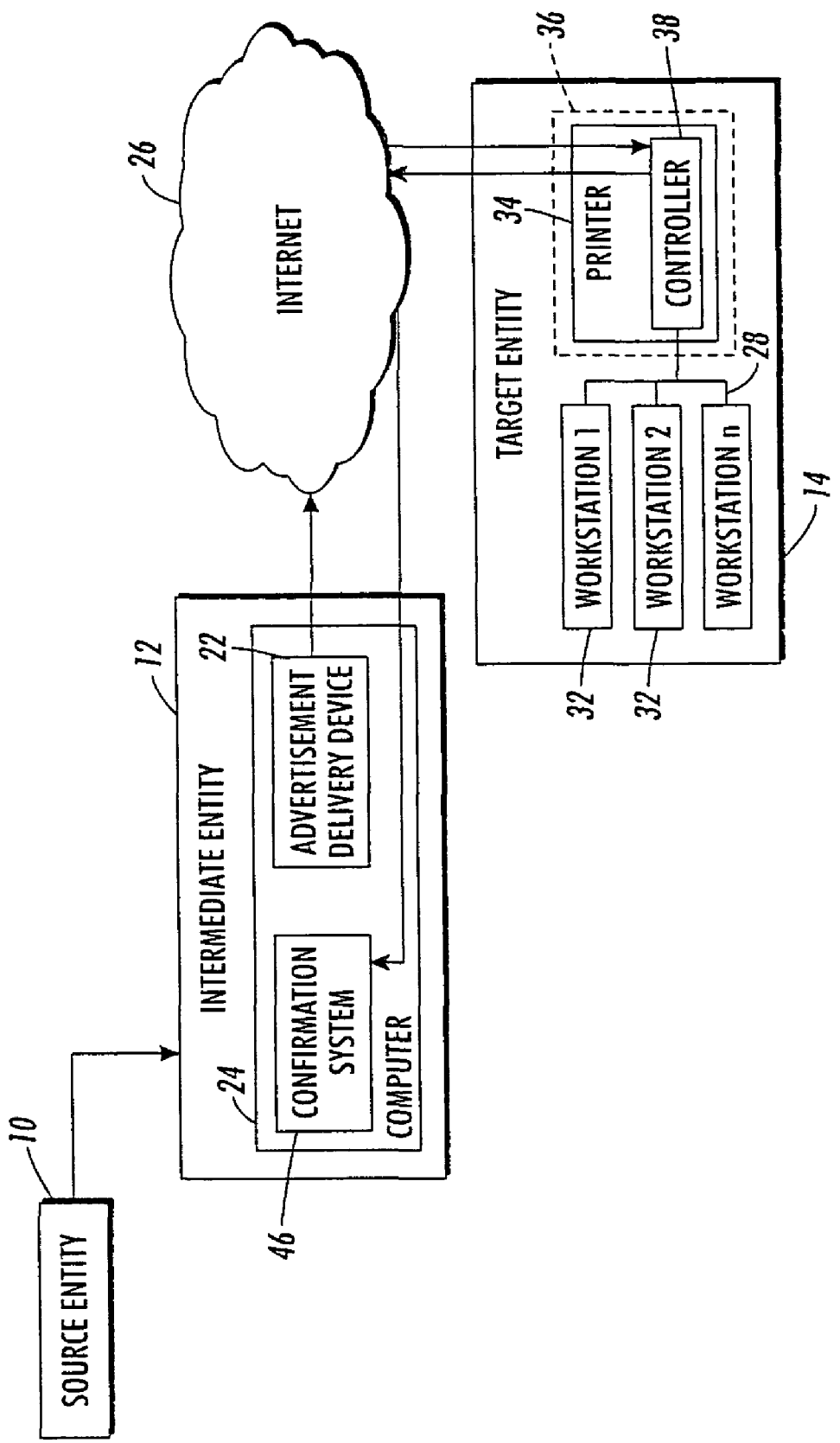
FIG. 1 is a schematic view of an example of a system for advertising on networked printers.

With reference to FIG. 1, an example of a system for advertising on networked printers includes a source entity 10, an intermediate entity 12 and a target entity 14. More than one of each entity can be provided in the system. Only one of each entity is shown simply for reasons of clarity. Many times, a single intermediate entity 12 will be in communication with a plurality of source entities and a plurality of target entities. The entities can be connected to one another via a network connection that can include local area network (LAN), wide area network (WAN), telecommunications lines, e.g. voice, and the internet. The advertising system will be further described with reference to the entities being connected to one another via the internet; however, this is not to be taken as limiting.

The source entity 10 will typically include an entity, e.g. a corporation, a business, a retailer, a service provider, and/or an individual, that wishes to advertise its/his products or services to consumers, which in the described embodiment can be associated with the target entity 14. The source entity 10 provides the intermediate entity 12 information, e.g. advertising material, which it wishes to be disseminated to the target entity 14. The information provided by the source entity 10 to the intermediate entity 12 can be in digital form, e.g. a digital document, or the information can be in analog form, e.g. spoken words, a paper document.

The intermediate entity 12 acts as an intermediary between the source entity 10 and the target entity 14. The intermediate entity 12 receives the information that the source entity 10 wishes to be disseminated to the target entity 14, e.g. a consumer or consumers, and then delivers this information, which may be in a different form than it was received from the source entity, to the target entity. The intermediate entity 12 is provided in this example to limit direct access between the source entity 10 and the target entity 14. An agreement can be in place between the intermediate entity 12 and the target entity 14 that allows the intermediate entity to communicate with the target entity as a trusted source. Nevertheless, if desired an agreement between the source entity 10 and the target entity 14 can be in place to allow access by the source entity to the target entity. In such an instance, the source entity 10 would qualify as a trusted source.

With reference back to the depicted example, more specifically, the intermediate entity 12 can deliver information that is to be printed or displayed by a printer 34 (described more fully below) at the target entity 14. The intermediate entity 12 includes an advertisement information delivery system 22, which will typically be found in a computer 24 that is connected to the internet 26.

Typically, the target entity 14 has an electronically networked system 28 of plural users, who operate workstations 32, sharing the networked printer 34. The networked system 28 can be an internal system, such as an intranet. Each workstation 32 typically includes a user interface (not shown) for receiving commands and instructions from a user, e.g. a keyboard and a pointing device, and a display device (not shown) for displaying instructions and documents to the user and also a processor and memory (not shown) suitable for running a document preparation program such as, e.g. a word processing program. These workstations 32 are known in the art; therefore, further description is unnecessary. The printer (or printers) 34 encompasses any apparatus such as a digital copier, bookmaking machine, facsimile machine, multi-function machine, etc. which performs a print outputting function for any purpose.

The network system 28 will typically have installed a firewall 36, or similar filtering system, that controls the information that is allowed to enter the network system of the target entity 14. The intermediate entity 12 can have an agreement with an administrator (or other person with authority) of the network system of the target entity 14 such that information being delivered from the intermediate entity 12 is allowed to be received by the network system 28 of the target entity 14 as a trusted source. The administrator of the network is a person or entity having control over the network as opposed to simply a user of a workstation 32. This allows the administrator of the network system 28 to choose the information, e.g. advertisements, that it wishes to receive and to limit direct access between the source entity 10 and the target entity 14. The target entity 14 may not wish to receive advertisements from certain entities, for example a business that competes with the target entity.

Generally, the advertisement information delivery system 22 of the intermediate entity 12 delivers the advertisement information to the target entity 14 via the internet 26. In the depicted example, the printer 34 (multiple printers can be provided) is controlled by a printer driver, or controller 38, which can either be incorporated into or be separate from the printer 34. Among other functions, the controller 38 instructs the printer 34 to automatically print banner sheets for all print jobs in non-mailbox system electronic printers with shared users. Such a banner sheet may be automatically printed by the printer and automatically inserted before or after the printing of the first or last sheets of each print job to provide job or set distinguishing and user identifying printing indicia, preferably visible from the top of the stack of sheets comprising the print job, if not obscured. The automatic generation of such banner sheets in a printer is well known and need not be described in detail herein. Printing banner sheets is helpful to the users of the networked printer 34 because the information that is displayed on the banner sheet allows the users of the networked printer to quickly separate print jobs. Printing of banner sheets, however, also increases the costs associated with printing documents due to the print media, e.g. paper, and marking material, e.g. ink, required to print the banner sheet.

Figure 2:
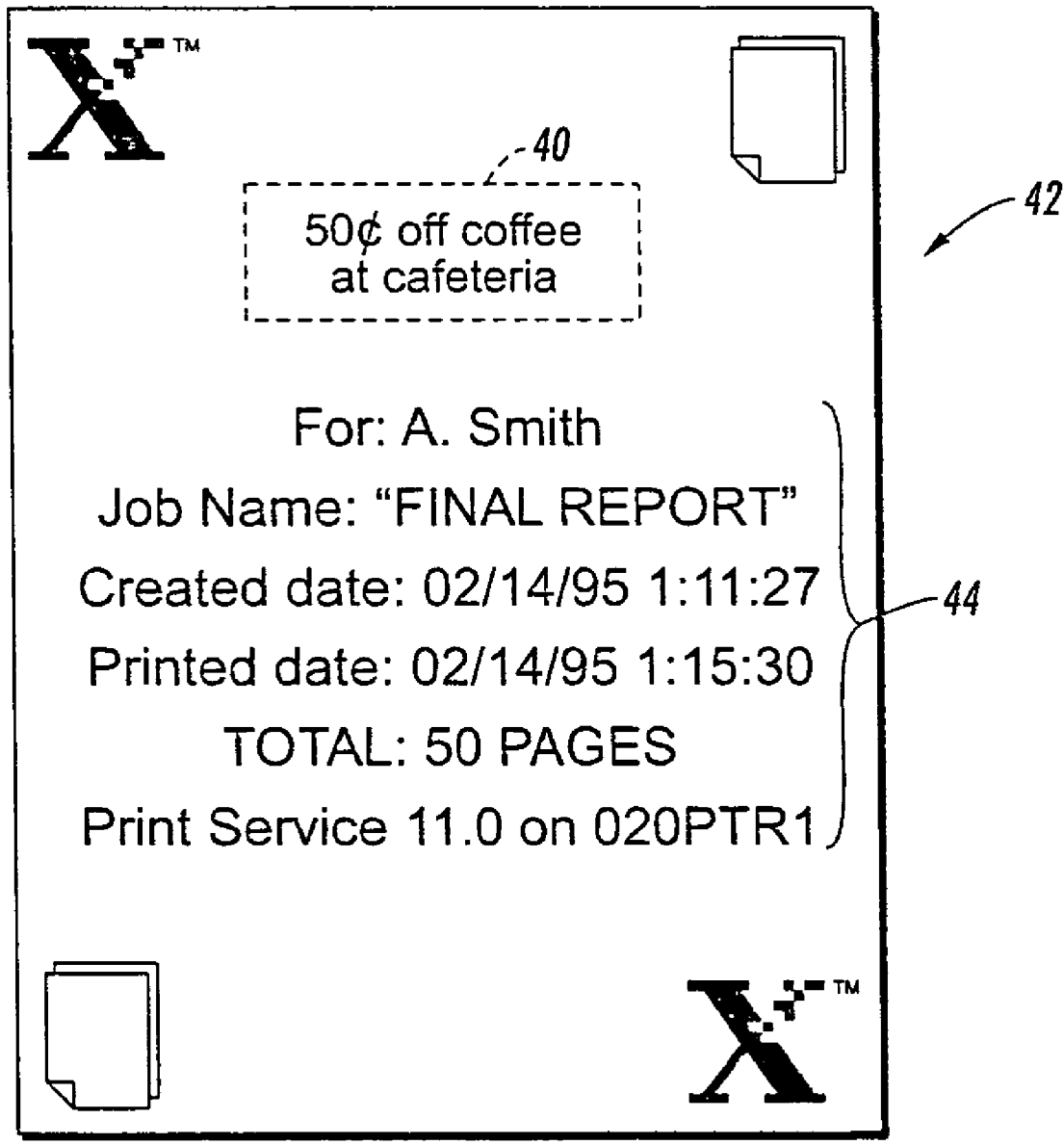
FIG. 2 depicts an example of a banner sheet for use with the system for advertising on networked printers depicted in FIG. 1.

The controller 38 in the depicted embodiment is in communication with the information delivery system 22 of the intermediate entity 14 via the internet. In such an instance, the controller 38 has its own internet protocol (IP) address. The controller 38 receives advertisement information from the advertisement information delivery system 22 of the intermediate entity 14. After receiving the advertisement information the controller 38 instructs the printer 34 to print an advertisement 40 (FIG. 2), on a banner sheet 42 (FIG. 2). The advertisement 40 is typically in addition to identifying printing indicia 44 (FIG. 2) that is typically found on a banner sheet.

The control 38 also communicates with a confirmation system 46 that can be found on the computer 24 of the intermediate entity 12. The confirmation system 46 can receive data that indicates that an advertisement has been printed on the target entity's printer 34. An incentive based system can be in place between the intermediate entity 12 and the target entity 14, which will be described in more detail below.

Figure 3:
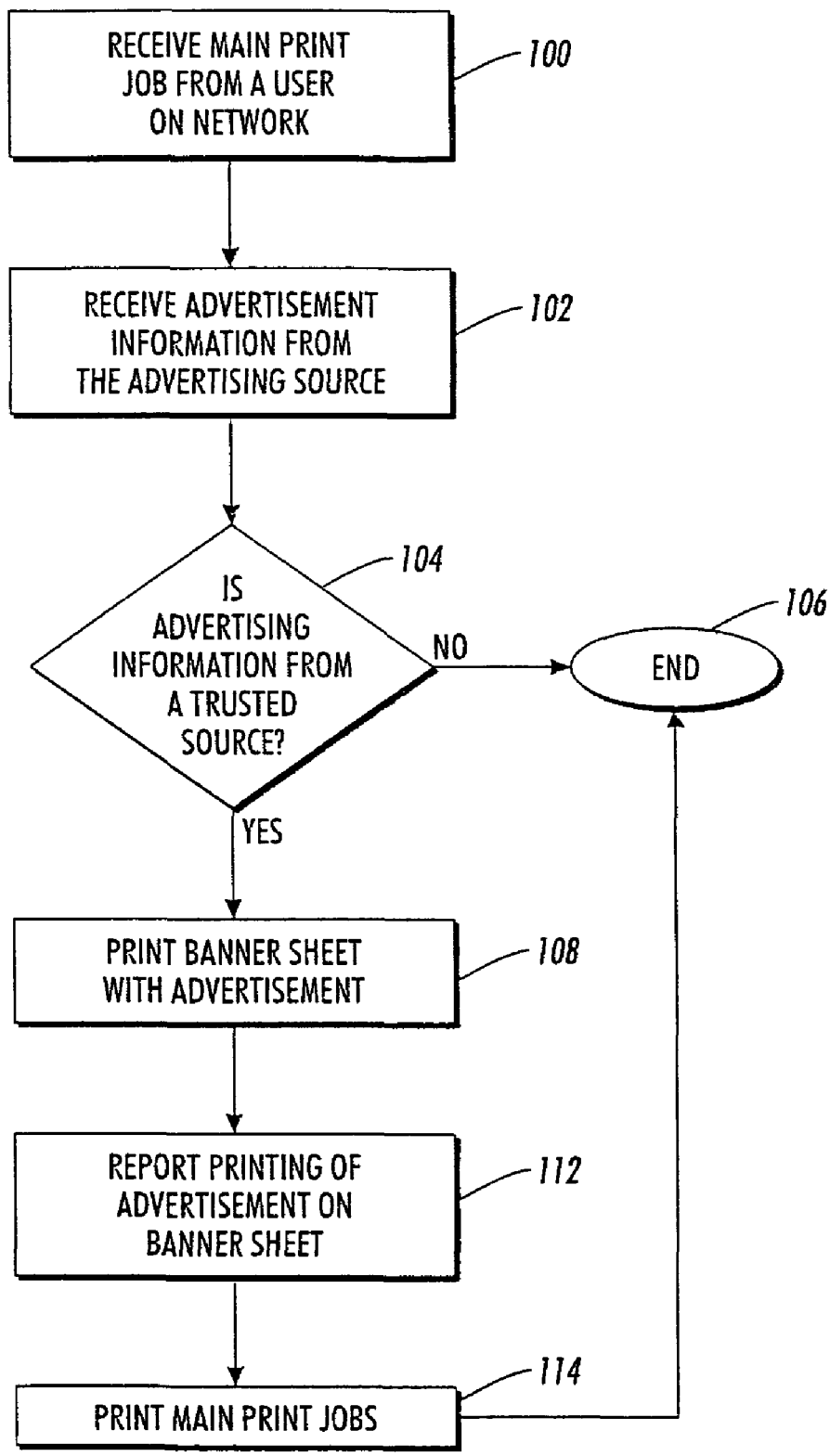
FIG. 3 is a schematic diagram of an example of a method for advertising on a networked printer.

With reference to FIG. 3, an example of a method for advertising on network printers will be described with reference to the actions that are taken by the target entity 14 (FIG. 1). Typically, a main print job is received 100. In the illustrative example, the main print job is received by the printer 34 (FIG. 1) from a workstation 32 (FIG. 1) that is operated by a user.

Also, advertisement information is received 102. As discussed above, the advertisement information is received by the printer 34 (FIG. 1) from the advertisement delivery device 22 (FIG. 1) of the intermediate entity 12. The order in which the main print job is received and the advertisement information is received is not critical. In other words, a main print job can be received by the printer 34 before or after the advertisement information is received from the advertising source.

Next, it is determined if the advertising information is received from a trusted source 104. In other words, the firewall 36 (FIG. 1), or other similar system, either grants or denies access to the controller 38. Typically, an agreement between the target entity 14 and the intermediate entity 12 (or the target entity 14 and the source entity 10) will allow the advertisement delivery device 22 of the intermediate entity 12 to pass through the firewall 36 to communicate directly or indirectly with, e.g. via a proxy (not shown) with the controller 38 of the printer 34. The administrator of the network of the target entity 14 and an intermediate entity 12 can enter into an agreement to limit the number of advertisements that are delivered to the target entity. The administrator of the network may also be able to filter the content of the advertisements that are delivered to the target entity. The administrator of the network of the target entity may also be able to control the time at which advertisements are delivered to the networked printer. The firewall 36 can be appropriately configured to take into account the above-mentioned limitations that might be imposed by the administrator. If access to the controller 38 is denied then the advertising information is not delivered and the method ends 106.

If the advertising information is from a trusted source, then a banner sheet 42 (FIG. 2) that includes the advertisement 40 is printed 108. An example of the banner sheet 42 is depicted in FIG. 2, which was discussed above. After the banner sheet 42 is printed, the printing of the advertisement on the banner sheet is reported 112. Also, the main print job is printed 114. The order of printing the banner sheet 108, reporting 112 and printing the main print job 114 is not critical. For example, many times a banner sheet can be printed after a print job to which it refers. Also, the reporting of the printing of the advertisement on the banner sheet can be conducted after the printing of the main print job 114 and/or banner sheet. Furthermore, advertising printing reports may be aggregated and transmitted on a periodic basis, e.g. daily, weekly or when a target number of advertisements have been printed.

With reference to FIG. 4, a method for advertising on a system of networked printers with actions performed by the advertising source, which in the depicted example is the intermediate entity, is more particularly described. The intermediate entity 12 (FIG. 1) receives permission 120. In the depicted example, permission is received from the administrator (or other person of authority) of the network 28 at the target entity 14 (FIG. 1). As discussed above, typically an agreement will be entered into between the intermediate entity 12 and the target entity 14 that describes the relationship between the two and how advertisements will be delivered to the networked printers 34. The agreement may also include how printing or displaying such advertisements will provide remuneration to the target entity 14. Advertising information is then delivered 122. More specifically, advertising information is delivered to a network printer 34 (FIG. 1) of the target entity 14 (FIG. 1). With reference back to FIG. 1, the advertisement delivery device 22 delivers advertisement information over the internet 26 to the controller 38 of the printer 34. The advertisement information is placed in computer readable form so that the controller 38 can generate an advertisement 40 (FIG. 2) on the banner sheet 42.

With reference back to FIG. 4, a confirmation is then received 124. In the depicted example and with reference back to FIG. 1, confirmation is received that the advertisement has been printed by the controller 38 of the printer 34 communicating via the internet 26 with the print confirmation system 46 of the intermediate entity 12. With reference back to FIG. 4, a credit can be applied 126. More specifically, a credit can be applied to an account in response to receiving the confirmation that the advertisement has been printed on the networked printer 34 (FIG. 1).

Through an agreement between the intermediate entity 12 and the target entity 14, credits can be applied to an account to reduce the price of consumables (paper, dry ink, etc.) that are used by the printers 34 of the target entity 14. Also, the credit to the account can simply be a monetary amount. The level or amount of the credit can be a function of the number of advertisements that the administrator of the network allows to be printed on the networked printers 34. The amount of the credit can also be a function of the restrictions that the administrator of the target wishes to set, e.g. only allow advertisements from local companies or only allow advertisements that are related to certain products. Less restriction of the advertisements that are delivered to the printers may increase the credit received.

As discussed above, the advertisement 40 is typically printed on a banner sheet 42. The user of a workstation 32 that is in communication with the networked printer 34, where the networked printer is a non-mailbox system, gives the banner sheet 42 a glance to identify the print job from others. Many times also a user of a workstation places another user's print job in a mailbox designated for that specific user with the banner sheet typically as the top sheet of the print job. Accordingly, the advertisement 40 is provided on a sheet, i.e. the banner sheet, which has a high likelihood of being read since the sheet includes important information useful to a user of the workstation. Therefore, companies wishing to advertise can have higher confidence that people are actually seeing the advertisements rather than putting them directly into a recycling bin. Moreover, the advertisement is provided on a sheet that is typically thrown away or recycled, thus not increasing greatly the waste stream generated by a printer. Therefore, the cost to the target entity is simply the ink charge cost, which can be offset or more than offset via the credit that can be applied to an account of the target entity.

The above-described system and methods can also be implemented to print an advertisement that is not printed on a banner sheet. For example, the advertisement delivery device 22 can communicate with the controller 38 so that the controller instructs the printer 34 to print a sheet containing an advertisement. Permission can be granted to allow for communication between the advertisement delivery device 22 and the controller 38 in the same manner as described above.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A system for advertising on a networked printer, the system comprising:
a target entity including a networked printer and a plurality of workstations operated by a respective plurality of users each in communication with the networked printer, the networked printer including a controller configured to generate a banner sheet page having user identifying printing indicia for distinguishing different print jobs that are printed by the networked printer and an administrator that maintains account information, requests trusted source status from a target source network administrators, records trusted source status, authenticates source entities as trusted sources prior to sending an advertising message, communicates agreements with target source administrators and places specific advertisements for distribution from trusted sources to selected target entities;
a trusted source entity including an advertisement delivery device in communication with the controller of the networked printer, wherein the advertisement delivery device communicates with the controller of the networked printer to deliver an advertisement that is printed on the banner sheet page generated by the networked printer, the advertisement being printed in addition to the user identifying printing indicia, wherein the advertisement spans the width of the banner sheet page and less than half of the height of the banner sheet
an intermediate entity comprised of:
an advertising information delivery system containing a controller which received advertising content from a source, alters advertising content, sends advertising content to an approved target, indicates whether advertisement should inserted before or after a print job, receives confirmation messages from target entities indicating the advertisement was received or printed; and
a report generator which generates printed reports on a daily, weekly, or on a number of advertisements run periodic basis; and
an incentive entity system located between the intermediate entity and the target entity that monitors confirmation of advertisement delivery and delivers compensation remuneration to the target entity upon confirmation.

2. The system of claim 1, wherein the controller of the networked printer is protected by a filtering system configured to limit access to the controller based upon content of message or identity of the information sender.

3. The system of claim 2, wherein the filtering system is configured to allow communication between the advertisement delivery device and the controller and to prevent unauthorized communication with the controller to filter the message through use of an intermediate controller.

4. The system of claim 3, wherein the filtering system is configured by an administrator of the networked printer and the plurality of workstations to filter the message received based on message content and identity of the message sender.

5. The system of claim 1, wherein the trusted source entity includes a confirmation system in communication with the controller, the accounting system configured to record credits for each printed advertisement.

6. The system of claim 5, wherein the controller delivers a confirmation message to the confirmation system in response to an advertisement being printed by the networked printer in order to confirm that the advertisement was printed.

7. The system of claim 1, wherein the controller includes an internet protocol address and the advertisement delivery device communicates with the controller via an internet.

* * * * *